(12) United States Patent
Kuqi et al.

(10) Patent No.: US 11,947,566 B2
(45) Date of Patent: Apr. 2, 2024

(54) EMPLOYEE DATA REPLICATION SYSTEM

(71) Applicant: SAP SE, Walldorf (DE)

(72) Inventors: Qendrim Kuqi, Ludwigshafen am Rhein (DE); Ping Hou, Hockenheim (DE); Sagar Joshi, Bangalore (IN); Frank Bareis, Mühlhausen (DE); Thomas Markotschi, Mannheim (DE); Tobias Lukas Bader, Rauenberg (DE); Aysan Mazloumi, Heidelberg (DE); Semih Gercek, Sankt Leon-Rot (DE); Hui Xu, Shanghai (CN)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 17/400,268

(22) Filed: Aug. 12, 2021

(65) Prior Publication Data
US 2023/0052094 A1 Feb. 16, 2023

(51) Int. Cl.
G06F 16/30 (2019.01)
G06F 16/27 (2019.01)
G06Q 10/105 (2023.01)

(52) U.S. Cl.
CPC ......... *G06F 16/275* (2019.01); *G06Q 10/105* (2013.01)

(58) Field of Classification Search
None
See application file for complete search history.

(56) References Cited

U.S. PATENT DOCUMENTS

| | | | |
|---|---|---|---|
| 8,515,794 B2 * | 8/2013 | Duparc | G06Q 10/06 709/202 |
| 8,725,654 B2 * | 5/2014 | Richter | G06Q 10/06 705/320 |
| 9,361,304 B2 | 6/2016 | Hobart et al. | |
| 10,263,964 B2 * | 4/2019 | Howell | H04L 63/068 |
| 2007/0150387 A1 * | 6/2007 | Seubert | G06Q 10/10 705/31 |
| 2008/0120129 A1 * | 5/2008 | Seubert | G06Q 40/125 705/305 |
| 2012/0101973 A1 | 4/2012 | Ito et al. | |
| 2012/0303407 A1 | 11/2012 | Fong et al. | |
| 2014/0074780 A1 * | 3/2014 | Goetsch | G06F 16/273 707/613 |
| 2014/0380012 A1 | 12/2014 | Sanford | |
| 2017/0220658 A1 * | 8/2017 | Goldmann | G06F 16/27 |
| 2018/0165339 A1 * | 6/2018 | Goldmann | G06F 16/27 |
| 2019/0108269 A1 * | 4/2019 | Suenderhauf | G06Q 10/1091 |
| 2021/0090028 A1 * | 3/2021 | Suenderhauf | G06F 16/27 |
| 2023/0016358 A1 * | 1/2023 | Poturnak | H04L 63/083 |

\* cited by examiner

*Primary Examiner* — Khanh B Pham
(74) *Attorney, Agent, or Firm* — Sterne, Kessler, Goldstein & Fox P.L.L.C.

(57) ABSTRACT

An employee data replication system receives a request to replicate employee data hosted by a host system. At least one of: a live date corresponding to when the employee data is to be live on the enterprise system or a selection of one or more applications to be used on the enterprise system is identified. A cutoff date for the employee data is calculated based on one or more of the live date and the selection of one or more applications, the cutoff date indicating an oldest date for which the employee data is to be replicated to the enterprise system. Employee data is replicated from the host system to the enterprise system based on the cutoff date, and an indication is provided that the replication has completed.

17 Claims, 9 Drawing Sheets

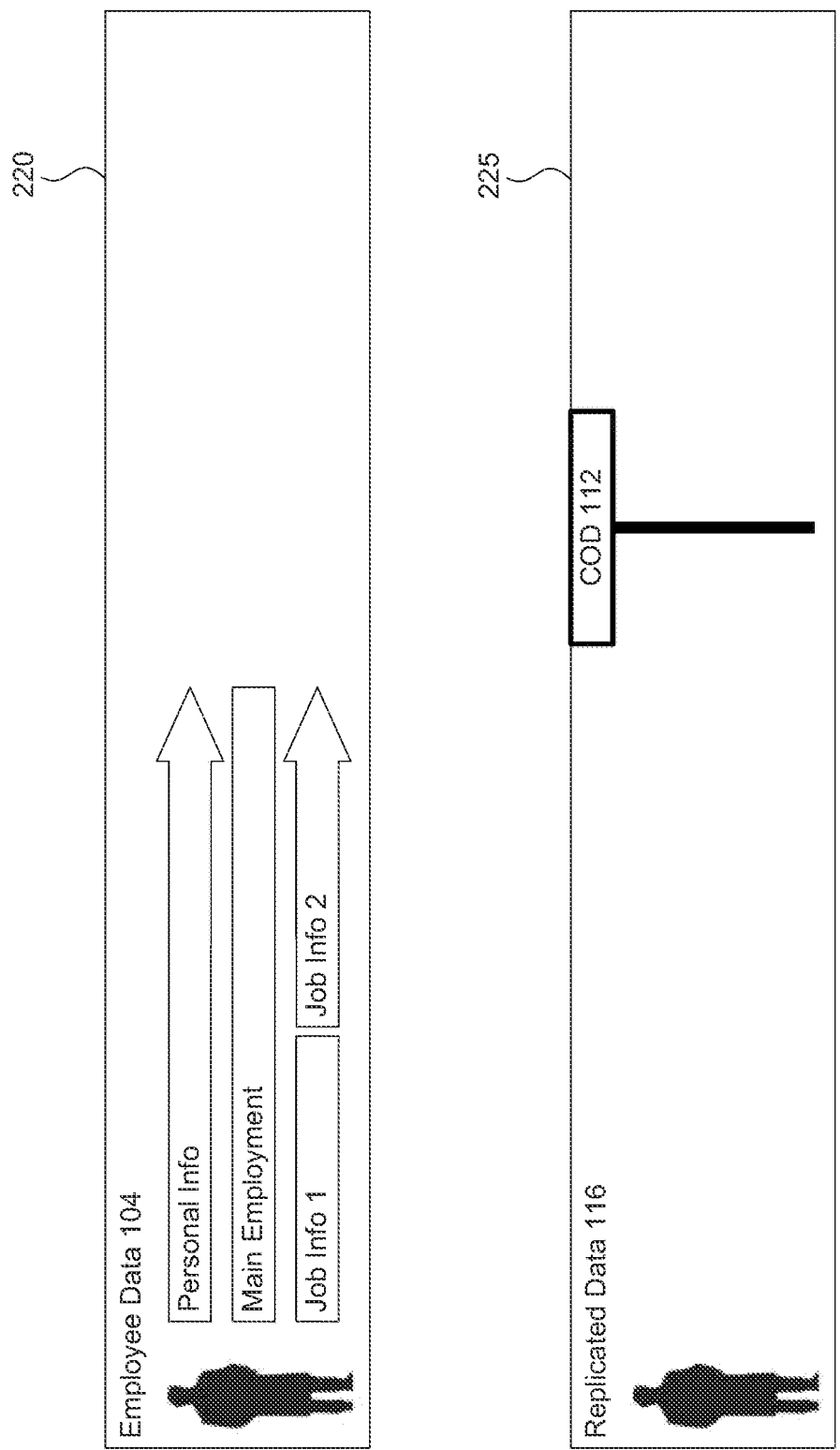

EMPLOYEE DATA REPLICATION SYSTEM

BACKGROUND

Replicating data from one system to another can be a slow and time consuming process, particularly if there is a large amount of data to be replicated. Data replication often requires not only copying data from a first location to a second location, but also requires making sure the data at the host system is properly or uniformly formatted prior to the replication process, which can itself be a time consuming and resource intensive task, particularly for old, historical, or legacy data.

BRIEF DESCRIPTION OF THE DRAWINGS

The accompanying drawings are incorporated herein and form a part of the specification.

FIGS. 2A-2F are block diagrams illustrating example functionalities related to an employee data replication system, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Replicating data from one system to another can be a slow and time consuming process, particularly if there is a large amount of data to be replicated. Data replication often requires not only copying data from a first location to a second location, but requires making sure the data at the host system is properly or uniformly formatted prior to the replication process, which can itself be a time consuming and resource intensive task, particularly for old, historical, or legacy data.

Figure 1:
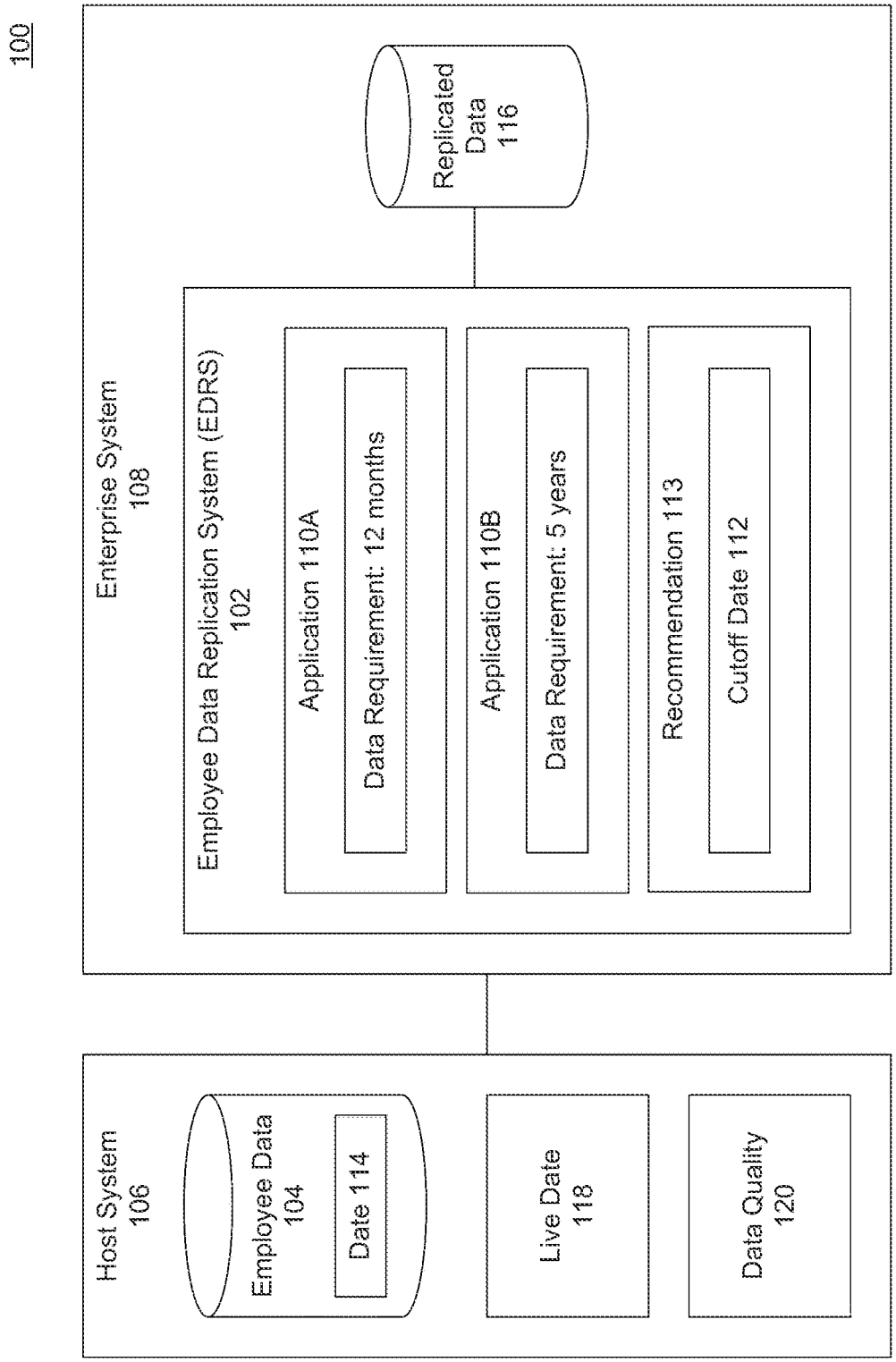
FIG. 1 is a block diagram illustrating functionality for an employee data replication system (EDRS), according to some example embodiments.

FIG. 1 is a block diagram 100 illustrating functionality for an employee data replication system (EDRS) 102, according to some example embodiments. EDRS 102 may enable faster or more efficient replication of employee data 104 of a host system 106 to an enterprise system 108.

In a simple replication process, all of the data from a host system will be replicated to a target or replication system. However data replication is a time-consuming and resource intensive process. First, administrators of the host system may need to ensure that all of the data to be replicated is stored in a definable or uniform format, so that the replication process can occur smoothly. For example, data from five years ago should be similarly formatted to data from twenty years ago. If the older, legacy data is in a different format than the more recent data, then these changes must be rectified by administrators before the replication process can take place or accounted for during the replication process, and either way this process requires additional valuable time and/or resources.

These activities waste valuable time and resources, particularly in situations when all of the data of host system 106 does not need replicated. For example, older, historical, or legacy data may no longer be valuable or necessary to conduct particular business operations and as such may not need to be replicated. In these situations, replicating this older data would consume and waste resources that could otherwise be preserved or reallocated to perform other computing tasks. In some embodiments, EDRS 102 may help identify which data of a host system 106 is valuable and should be replicated and which data can be excluded from replication, thus saving valuable time and computing resources, while speeding up the replication process.

In some embodiments, EDRS 102 may calculate or generate a cutoff date 112. Cutoff date 112 may a date or time beyond which or earlier than which data from a host system 106 is excluded from replication to an enterprise system 108. For example, cutoff date 112 may indicate that any data with a date 114 before May 12, 2017 is not replicated, or data greater than seven years old is not replicated. Cutoff date 112 may be based on a date 114 field or value associated with various records of employee data 104.

In some embodiments, cutoff date 112 may indicate what data is included in replication. For example, cutoff date may indicate data that only data records that have been updated in the previous six and a half years will be replicated. In some embodiments, cutoff date 112 may include a range of values indicating a start date/time and end date/time for which data is or is not replicated. For example, cutoff date 112 may indicate that only data from Jan. 1, 2015-Jan. 1, 2020 is replicated.

In some embodiments, cutoff date 112 may correspond to a date 114 field from a set of employee data 104 maintained by host system 106, and which is to be replicated to enterprise system 108. Date 114 may be any date value that is included in or otherwise associated with a set of records across one or more tables of employee data 104, including metadata. Example dates 114 include, but are not limited to: birthdate, employment start date, employment end date, last date of record update, first sale date, last sale date, etc. In some embodiments, a date 114 field may include a range of values (e.g., earliest and most recent dates), and cutoff date 112 may be a value or values within the range.

In some embodiments, EDRS 102 may generate multiple cutoff dates 112 for various dates 114 across different records across one or more tables. For example, if records of a particular table of employee data 104 includes both an employee start date 114 and an employee end date 114, EDRS 102 may generate a cutoff date 112 for the start date and/or the end date. If a different table includes records with an employee birthdate or contract end date, then EDRS 102 may generate additional cutoff dates 112 for those fields as well. Or, for example, those dates may be ignored, and only employee information falling within the enumerated start and/or end dates by cutoff date 112 may be selected for replication.

In some embodiments, cutoff date 112 may be the same value (e.g., Jun. 9, 2008 or four years prior to today) across all or multiple the date 114 fields. In other embodiments, each date field 114 may include its own unique cutoff date 112 (e.g., the cutoff date 112 for employee start date may be Jan. 1, 2000, while the cutoff date 112 for contract start date is Dec. 31, 2012).

In some embodiments, EDRS 102 may generate cutoff date 112 to speed up the replication process, consume fewer resources by limiting which data from host system 106 is replicated to an enterprise system 108. In some embodiments, cutoff date 112 may be used to generate and execute a query by only selecting the records that satisfy the cutoff date 112 criteria for replication from host system 106 to enterprise system 108.

Enterprise system 108 may be any computing system, other than host system 106, where at least a portion of employee data 104 is to be replicated. In some embodiments, enterprise system 108 may be a cloud system, set of servers, or other data or communications network. In some embodiments, enterprise system 108 may offer various programs or applications 110A-110B that may be used to access and/or update the replicated data 116 from host system 106. The selected cutoff date 112 may both speed up replication and get the selection application(s) 110A, 110B up and running faster than would otherwise be possible, which may help increase productivity and output, as well as better utilize resources.

Host system 106 may be a set of one or more computing devices that store, host, or otherwise are configured to access employee data 104. Employee data 104 may be any date-based data, at least a portion of which, is to be transferred or replicated to enterprise system 108. In some embodiments, employee data 104 may include any personnel records of an organization, such as various roles and information pertaining to the employment of various past and present employees. Employee data 104 may include other business or organization data as well, such as, business partnerships, clients, customers, sales data, financial data, etc. The term employee data 104 is not meant to be limited to only employee or business related data, but instead, the term employee data 104 represents one possible embodiment and is used for simplicity in explaining the processes and functionality of EDRS 102.

Employee data 104 may include any timestamped or date-associated data, for which a cutoff date 112 may be generated. Date 114 may be a timestamp indicating when the various data or records were added, ended, updated, or may include time/date values associated with a particular record (e.g., birthdate).

In some embodiments, records of employee data 104 may include a date 114 indicates a start date as to when an employee began his term of employment (e.g., Jun. 9, 2000) in a particular role 1. The records may also include any subsequent start/end dates 114. For example, the same or different record may indicate that on Jul. 14, 2004 the employee both left role 1 and began working in a different project or role 2. In another embodiment, there may be overlap in the dates between role 1 and role 2, indicating a period of time when the employee was working on two different projects or in two different roles simultaneously.

If cutoff date 112 is Jul. 15, 2004, different data may selected for replication based on the various start/end dates depending on whether there is any overlap in the end date of role 1 and the start date of role 2. If there is no overlap, because role 1 ended on Jul. 14, 2004, then the data associated with role 1 may be excluded from replication. However, if role 1 did not end until Aug. 14, 2004, then at least a portion of the role 1 data may be selected for replication.

In some embodiments, EDRS 102 may calculate cutoff date 112 based on any number of various factors, some of which may be provided by a user or administrator of host system 106. For example, EDRS 102 may receive a selection of which applications 110A, 110B are to be used with the replicated data 116, a live date 118 as to by when the data should be replicated and/or by when the selected applications should be active, and/or a data quality 120 indicator that indicates how ready the employee data 104 is to be replicated or how much work may be required by the administrator to prepare the employee data 104 for replication or an indication of how many data transformations may need to be performed on the employee data 104 during replication. These and other factors may be used by EDRS 102 to generate one or more cutoff dates 112 for various tables, fields, or records of employee data 104.

In some embodiments, applications 110A, 110B may include apps, computer programs including web programs that are used to access or update data. For example, application 110A may be an employee vacation and time off tracker program. In some embodiments, applications 110A, 110B may include various uses or categories of data. For example, application 110B may be tax data or data pertaining to legal cases or that is being stored to adhere to various legal requirements or one or more data retention policies. As illustrated, each application 110A, 110B may have its own data requirement.

The data requirement may indicate a preferred and/or required length of time for which historical or past data for the particular application 110A, 110B may have access in replicated data 116. For example, the vacation and time off program may track how many days off each employee took for the previous year, and thus may prefer the previous 12 months of data, but any amount of data may be effective with the program. In other embodiments, 12 months of data may be required. The data requirement for the tax data application 110B may be five years, which may conform to legal requirements on how long tax data must be maintained, reported, or accessible. In some embodiments, the tax data application 110B may also include a preferred data requirement of ten years, or application 110A may include a preferred data requirement of 3 years.

If a user or administrator of host system 106 selects application 110A, the EDRS 102 may calculate and suggest a cutoff date 112 of 12 months. As such, during the replication process, only employee data 104 for the previous 12 months pertaining to vacation and time off may be replicated.

In some embodiments, cutoff date 112 or exceptions to cutoff date may be generated based on internal or legal record retention policies. For example, certain financial data may never be deleted or excluded and may always be replicated because of laws or a company's own policy. Or, for example, a company may have a policy to retain all employee vacation data for seven years, in which case any replication of employee vacation data may be at least seven years.

If a user or administrator approves the cutoff date 112, or selects automatic approval, EDRS 102 may generate or receive a structured query language (SQL) statement that identifies one or more tables, records, and/or columns of employee data 104 where vacation data is stored. EDRS 102 may then signal for replication or replicate only the previous 12 months of data from the selected table(s) as corresponding to the query that was generated based on cutoff date 112. Then, for example, even if employee data includes 10 years of vacation data, any data older than 12 months would be excluded from replication, saving considerable time and resources and providing faster access to application 110A. Application 110 may then generate new real-time data which is added to replicated data 116.

If the user or administrator selects the application 110B, cutoff date 112 for application 110B may be 5 years. In some embodiments, EDRS 102 may provide, suggest, calculate, or generate multiple cutoff dates 112 for various portions of employee data 104. For example, EDRS 102 may generate a first cutoff date 112 for a first table of employee data 104 and only replicate 12 months of vacation data, while also generating a second cutoff date 112 for one or more financial tables and replicating 5 years of financial and/or tax data.

In some embodiments, the longest time period for the various selected applications 110A, 110B may be used for all employee data 104, so that a single cutoff date 112 may be suggested for replication of employee data 104. For example, 5 years may be the recommended cutoff date 112 for which employee data 104 is to be replicated to enterprise system 108.

In some embodiments, an administrator of host system 106 may provide information such as a live date 118 and/or data quality 120 indicator that may be used to generate, calculate, modify, increase, or reduce cutoff date 112. Live date 118 may indicate a particular date/time when the administrator wants or needs the replication process to have completed and/or any selected applications 110A, 110B accessible to read or update replicated data 116.

The sooner the live date 118 is to the current time, the sooner the cutoff date 112 may be. For example, EDRS 102 may include a mechanism to predict how long it takes, on average, to replicate data which may be based on previous replications and/or the computing resources and/or bandwidth available to perform replication. If live date 118 is 1 hour from the current time, EDRS 102 may generate a shorter cutoff date 112 (such as 3 months) relative to a live date 118 of next week, which may enable enough time to EDRS 102 replicate more data, such as up to 10 years.

Data quality 120 may be a measurement or indicator provided by an administrator of host system 106 that indicates how ready the employee data 104 is for replication, or how closely the employee data 104 matches a data model. In some embodiments, data quality 120 may indicate a date prior to which employee data 104 is in a different format (e.g., due to being legacy or historical data) than more recent data. In some embodiment, data quality 120 may indicate how many data transformations are to be performed during the replication process, where more data replications require greater resources and take more time.

In some embodiments, data quality 120 may be a numeric measure (low quality) 1-10 (high quality), or an indicator of low, medium, or high quality data. High quality data may require little/no preparation by an administrator prior to beginning a replication process, or no data transformations (e.g., more direct copy-paste). Medium quality may require some effort by administrator to clean up the data or some simple data transformations. Low quality, may require a lot of effort or resources to clean up, transform, or reformat employee data 104. As such, high quality data may cause EDRS 102 to generate a longer cutoff date, versus low quality data.

In some embodiments, EDRS 102 may weigh the live date 118, data quality 120, and data requirements of the selected applications 110A, 110B to generate or calculate one or more cutoff dates 112. In some embodiments, the initial or longest cutoff date 112 may be the longest preferred data requirements across the selected applications 110A, 110B. EDRS 102 may then adjust this date to a sooner date (e.g., resulting in replicating less data) based on the live date 118, data quality 120, and/or available computing resources.

In some embodiments, an administrator of host system 106 may select an option enabling EDRS 102 to automatically pursue data replication with its suggested cutoff dates 112, and without requiring explicit approval by the administrator. In these cases, EDRS 102 may proceed accordingly, and only generate a recommendation 113 if there is an issue or conflict. For example, if the live date 118 (which may be in 60 minutes) does not allow enough time to replicate the data that is required for one or more selected applications 110A, 110B (which may be five years), EDRS 102 may generate a recommendation 113 requesting feedback or confirmation on which data to replicate, or how to adjust cutoff date 112.

Upon receiving recommendation 113, the administrator has the option of accepting the recommended cutoff date(s) 112 or providing a different cutoff date 112 to be used in replication. In some embodiments, EDRS 102 may generate and provide a recommendation 113 with one or more suggested cutoff dates 112 to the administrator(s) of host system 106, regardless of whether there is an issue/conflict or not. In some embodiments, recommendation 113 may include one or more cutoff dates 112 and an indication of the various factors accounted for in generating the recommended dates.

As an example, live date 118 may be in two hours, however application 110A may have a data requirement of 12 months. EDRS 102 may determine based on bandwidth and processor availability it will be impossible to get 12 months of data replicated in two hours. In some embodiments, the bandwidth may account for other processes or applications that are operating across one or more systems, and may include network bandwidth and/or computing bandwidth across one or more devices. As such, EDRS 102 may provide a recommendation 113 that only 3 months of data may be replicated to meet the two hour deadline (with a warning that the data requirement is 12 months).

The recommendation 113 may also include a 12 month data replication recommendation, which may push the live date to approximately 8 hours instead of 2 hours. The administrator may then select 3 months, select 12 months, or select any other number for cutoff date 112, such as 6 months. Or, the administrator may provide a new live date 118, which may be used to generate a new cutoff date 112 or may otherwise cause EDRS 102 to replicate as much data as possible before that time. In other embodiments, recommendation 113 may not allow an administrator to select or provide any cutoff date 112 that would produce less than the indicated data requirement of application 110A, 110B.

Once the cutoff date 112 has been approved by an administrator, the replication process may begin or be started by administrator (who may need to clean up the employee data 104) prior to beginning, and the administrator may be notified when replication completes. Or, various data transformations may be provided by the administrator which may be performed on the data during the replication process. In some embodiments, the actual replication process may be performed by a system other than EDRS 102.

In some embodiments, multiple processors or computing devices may be available or made available for replicating data. For example, a primary server may be responsible for replicating data from host system 106 to enterprise system 108. When a request from host system 106 is received or a received request is processed, EDRS 102 may initially determine whether primary server is available to satisfy the request before the live date 118 (if any). If the primary server is available and has the necessary bandwidth, then replication may continue on primary server.

However, if EDRS 102 determines that the primary server cannot meet all the requirements of the request (e.g., by the live date 118), due to a lack of resources or increased workload, EDRS 102 may evaluate whether one more secondary servers are available for the replication. In some embodiments, EDRS 102 may automatically (without user intervention) switch from the primary server to the available secondary server(s). If, however, the live date 118 cannot be satisfied by any available server, EDRS 102 may identify the server with the most available resources or bandwidth, and provide a recommendation 113 based on the identified server, so as to maximize how much data may be replicated prior to the live date 118.

In some embodiments, EDRS 102 may receive a recurring or automated request for replication that is to be fulfilled, with a recurring live date 118. For example, every Friday at 11:00 p.m. a request may be received that needs to be completed by Friday at 11:59 p.m. (live date 118). As noted above, if there is available bandwidth and/or computing capacity, the replication request may run as described herein. However, if there are bandwidth or computing capacity issues where all the data may not be replicated by the live date 118, EDRS 102 may send an electronic message (e.g., email, phone call, text message, instant message/chat) to one or more users requesting feedback on a recommendation 113 of how to proceed.

Figure 2A:
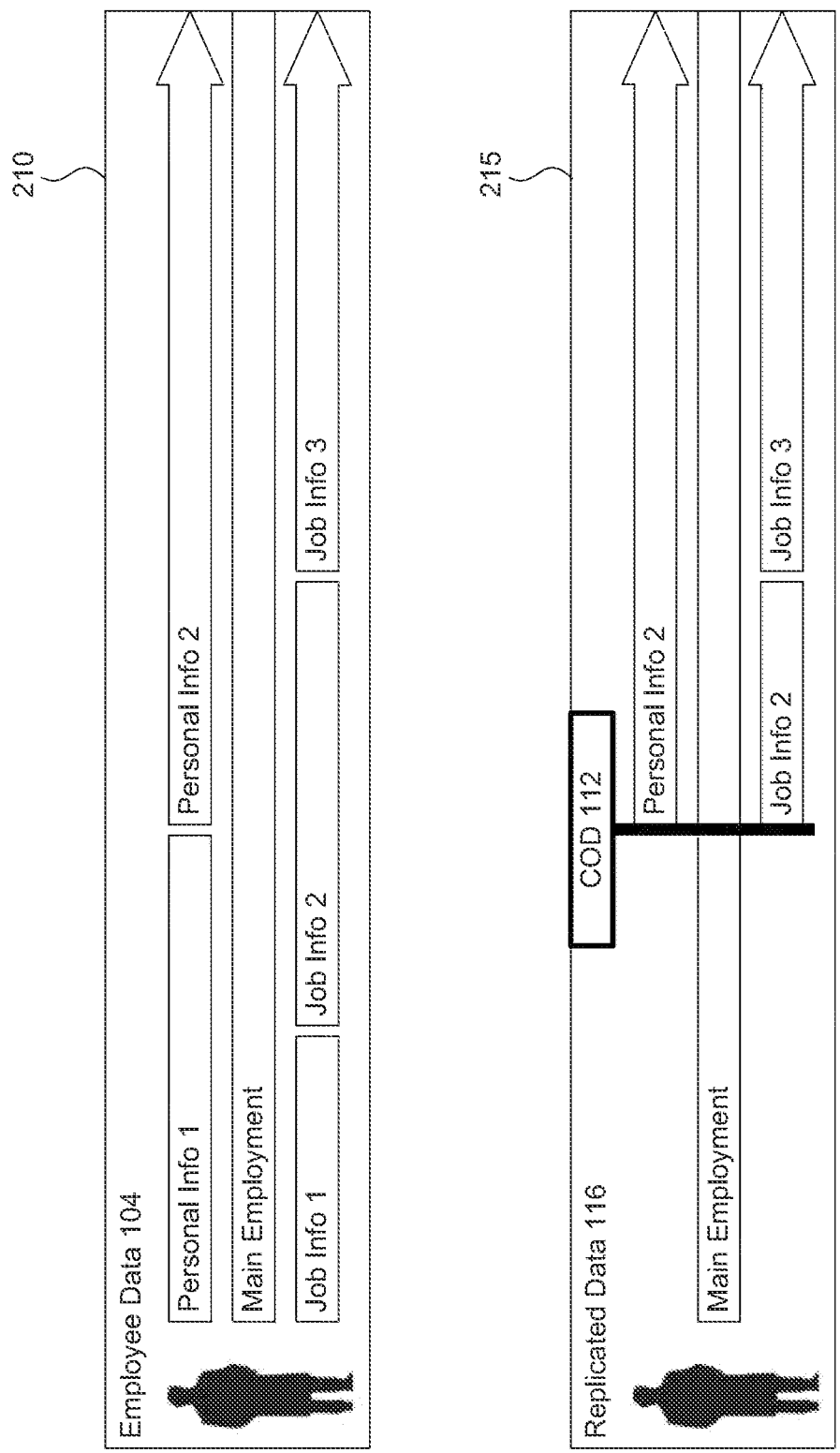

FIGS. 2A-2F are block diagrams illustrating example functionalities related to an employee data replication system, according to some embodiments. In FIG. 2A, box 210 is a visual representation of what employee data 104 is hosted by host system 106 for a particular employee. For example, personal info 1 may represent a first employee home address, while personal info 2 which may relate to a new employee address after the employee moved to a new home. Job info 1-3 may pertain to various roles or projects on which the employee worked. And the main employment box may indicate that there was continuous employment in the company across the various time periods.

Box 215 is a visual representation of which employee data 104 from box 210 is replicated based on the selected or generated cutoff date (COD) 112. For example, personal info 1 may not be replicated since it is before COD 112, while personal info 2 which may relate to a new employee address after the employee moved is replicated. Similarly, while job info 1 is excluded from replication, he job info 2-3 may be replicated. As illustrated in box 215, all the information prior to COD 112 may be cut off, or not replicated, with the exception of the start date of the main employment.

In FIG. 2B, box 220 may indicate what employee data 104 is stored by host system 106, and box 225 may indicate which of the employee data 104 is replicated. Box 220 may represent an employee who left the company (retired, quit, or was terminated) prior to the COD 112, in which case no employee information for the employee may be replicated.

Figure 2C:
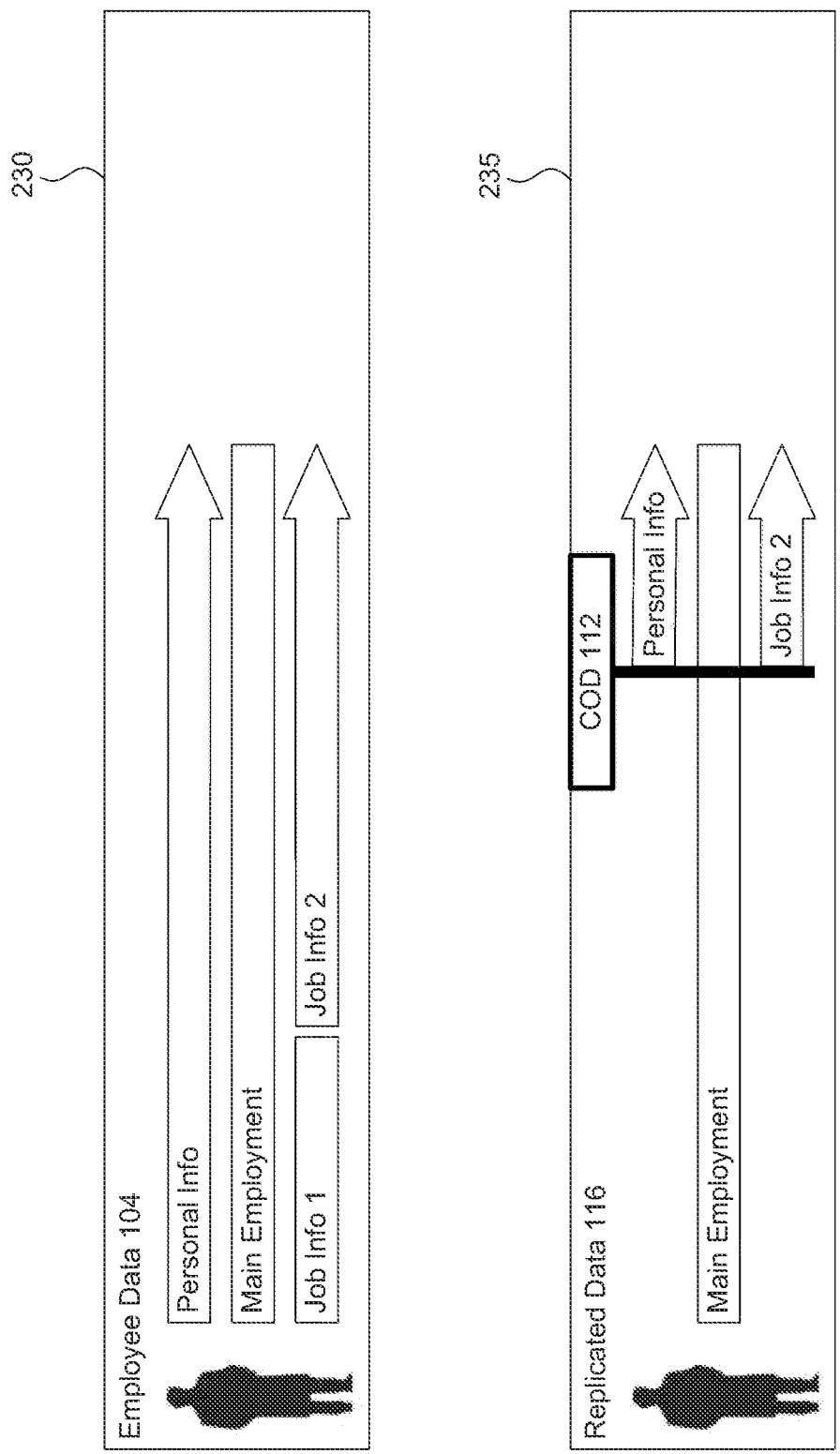

In FIG. 2C, box 230 may indicate what employee data 104 is stored by host system 106, and box 235 may indicate which of the employee data 104 is replicated into replicated data 116. The example of FIG. 2C may represent an employee who left the company after the COD 112 date. As such, any non-active information, such as job info 1, is then excluded from data replication.

Figure 2D:
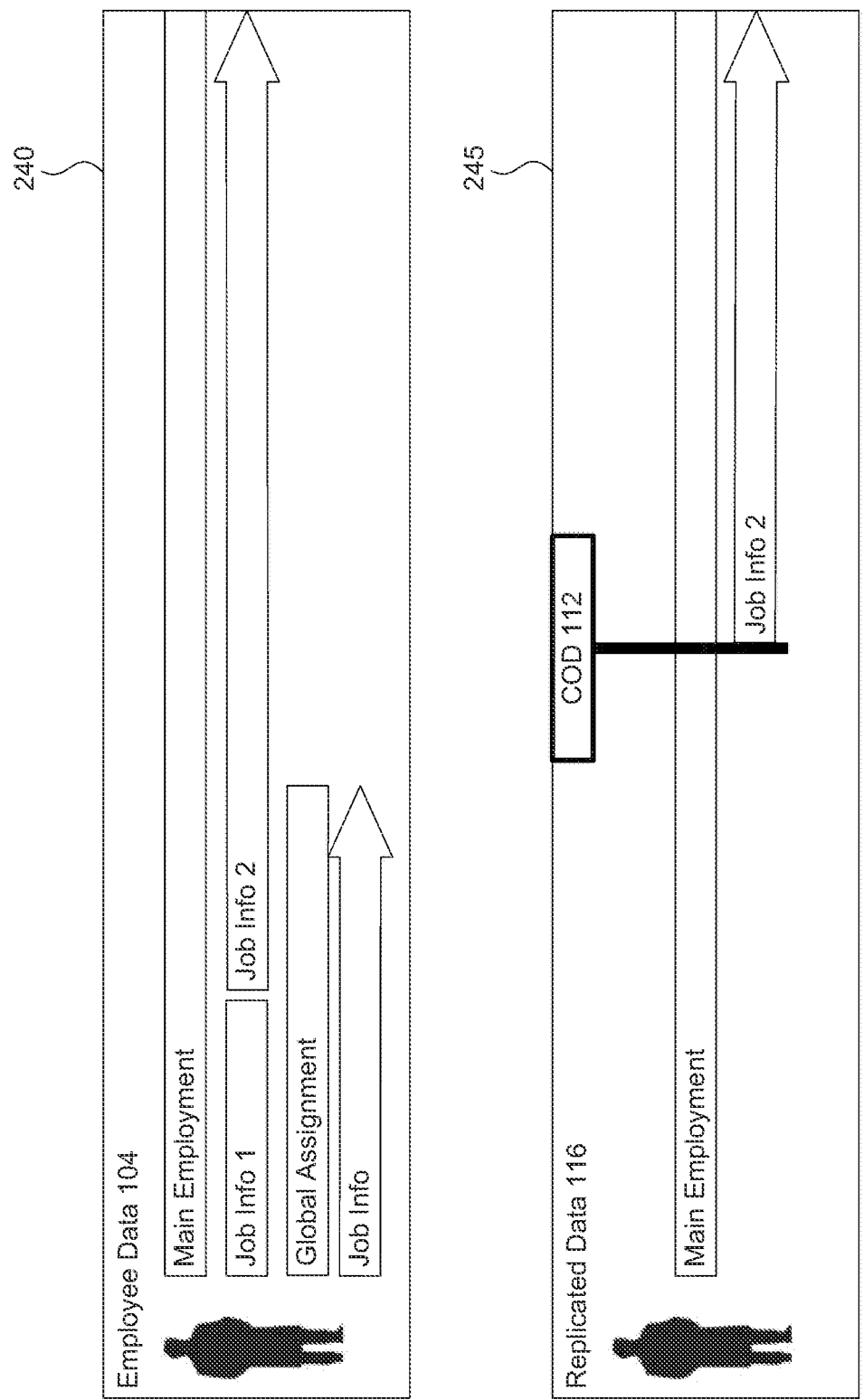

In FIG. 2D, box 240 may indicate what employee data 104 is stored by host system 106, and box 245 may indicate which of the employee data 104 is replicated. Box 240 may represent that the employee may have had multiple roles in the company, and was terminated or left some of those roles while retaining or entering into new positions. The old role information that completed prior to COD 112 is excluded from replication.

Figure 2E:
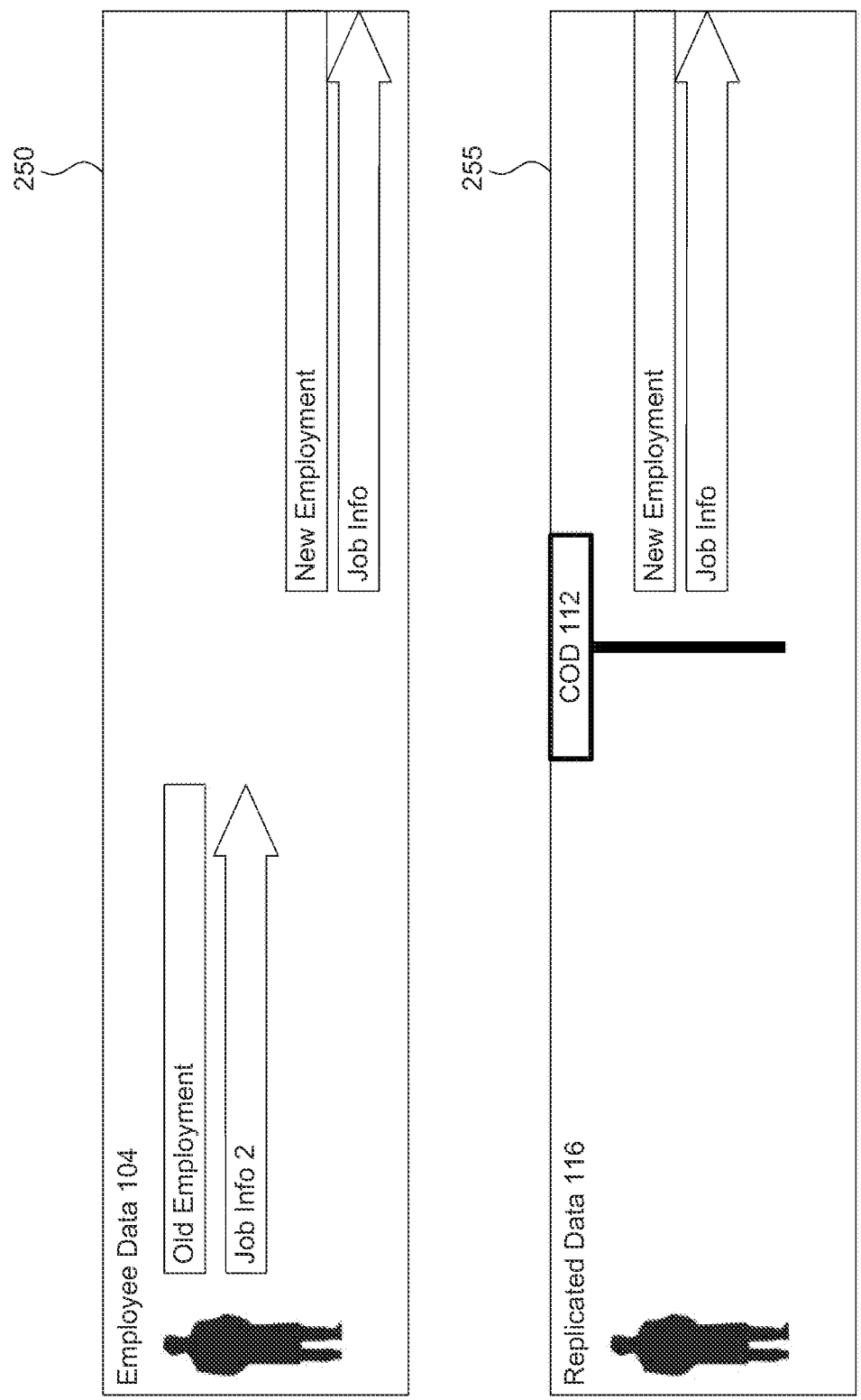

In FIG. 2E, box 250 may indicate what employee data 104 is stored by host system 106, and box 255 may indicate which of the employee data 104 is replicated. Box 250 may represent an employee left the company before the COD 112, and was re-hired or returned after the COD 112. In this example, only the new employment data, after COD 112, is replicated as replicated data 116.

Figure 2F:
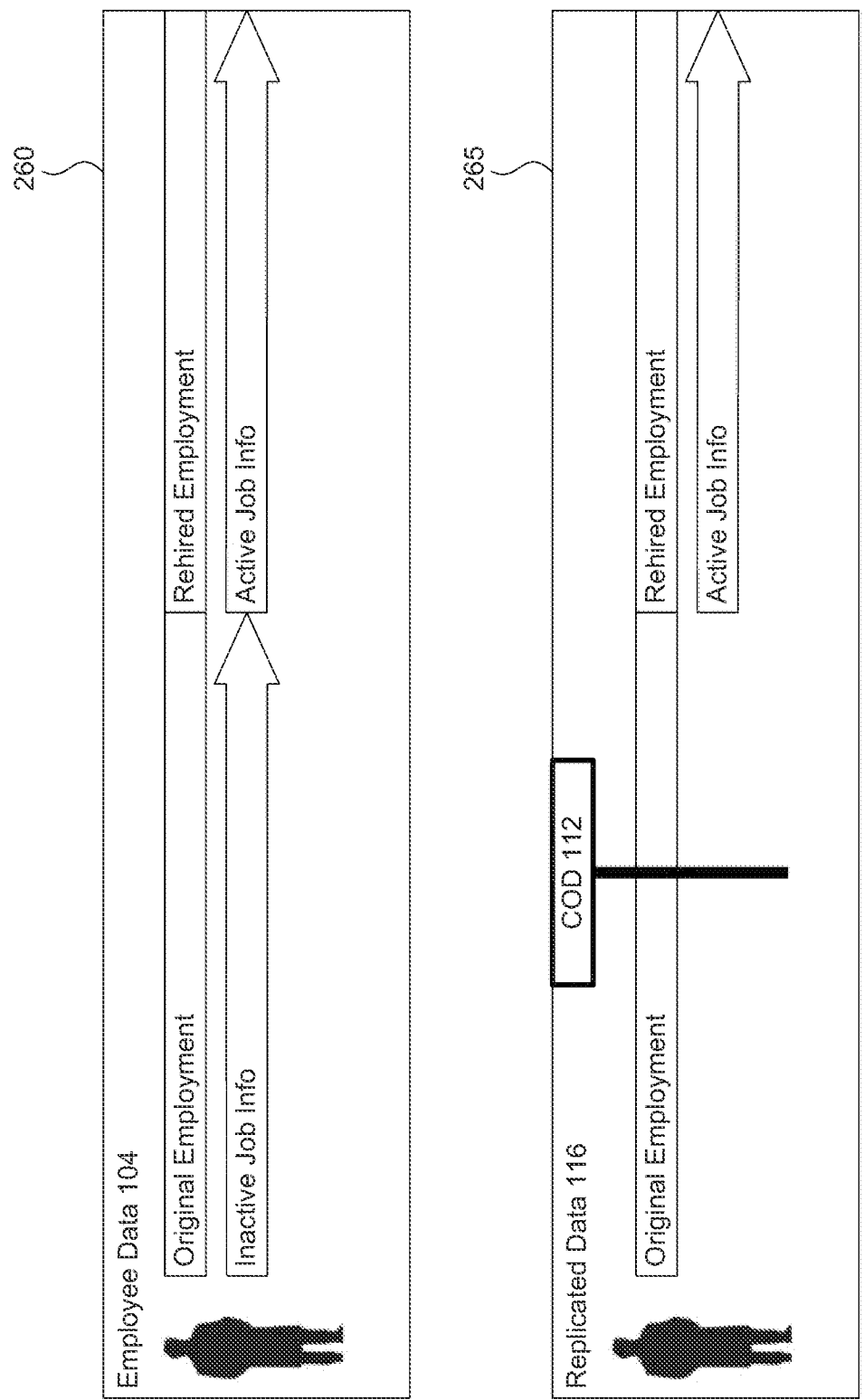

In FIG. 2F, box 260 may indicate what employee data 104 is stored by host system 106, and box 265 may indicate which of the employee data 104 is replicated. Box 260 may represent an employee who left a particular role on a contract before the COD 112, and is later re-hired onto the same contract. In this case, the original employment date may be retained for the employee since the contract is still ongoing while any other employee related employment data prior to COD 112 is excluded from replication.

Figure 3:
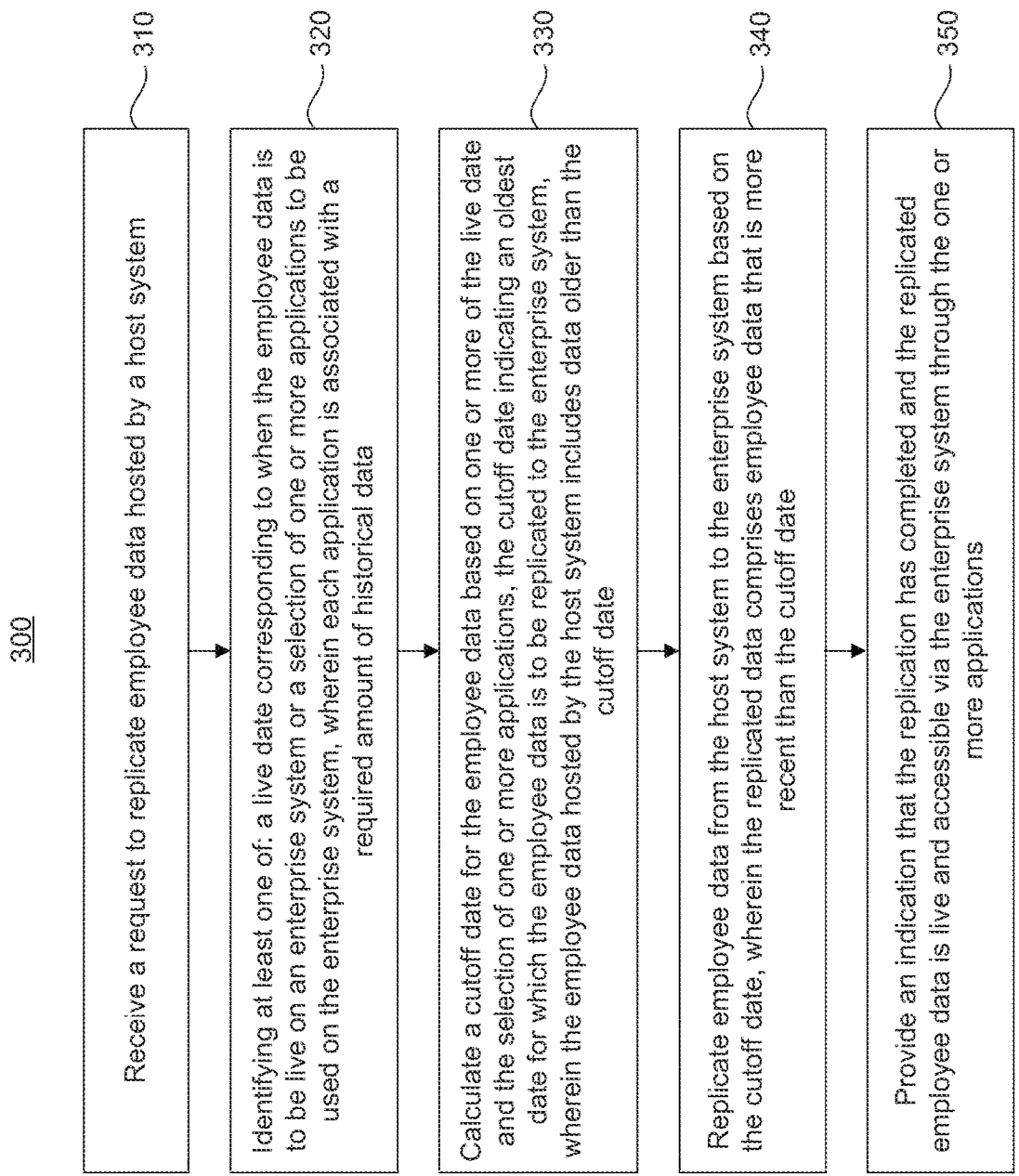
FIG. 3 is a flowchart illustrating example operations for functionality related to an employee data replication system, according to some embodiments.

FIG. 3 is a flowchart 300 illustrating example operations for functionality related to an employee data replication system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to the figures.

In 310, a request to replicate employee data, hosted by a host system, is received. For example, EDRS 102 may receive a request from host system 106 to replicate at least some portion of employee data 104. Though illustrated as part of enterprise system 108, in other embodiments, EDRS 102 may be a separate system that is communicatively coupled to enterprise system 108 and/or host system 106.

In 320, at least one of: a live date corresponding to when the employee data is to be live on the enterprise system or a selection of one or more applications to be used on the enterprise system is identified. For example, the request may include selection of one or more applications 110A, 110B and/or a live date 118. In some embodiments, EDRS 012 may request or receive a data quality 120 indicator from an administrator of host system 106.

In 330, a cutoff date for the employee data is calculated based on one or more of the live date and the selection of one or more applications, the cutoff date indicating an oldest date for which the employee data is to be replicated to the enterprise system. For example, EDRS 102 may generate one or more cutoff dates 112 corresponding to one or more date 114 fields across various records or tables of employee data 104.

In 340, employee data is replicated from the host system to the enterprise system based on the cutoff date. For example, EDRS 102 may initiate or provide the cutoff date 112 to another system that performs replication of a selection of employee data 104, prior to or within the bounds of cutoff date 112, to enterprise system 108. FIGS. 2A-2F illustrate various examples of data that is and is not replicated based on a generated cutoff date (COD) 112.

In 350, an indication that the replication has completed and the replicated employee data is live and accessible via the enterprise system through the one or more applications is provided. For example, EDRS 102 may provide a notification to an administrator upon a completion of the replication process, or applications 110A, 110B may send a notification to the administrator or one or more registered users that the applications are now available to access or update replicated data 116.

Figure 4:
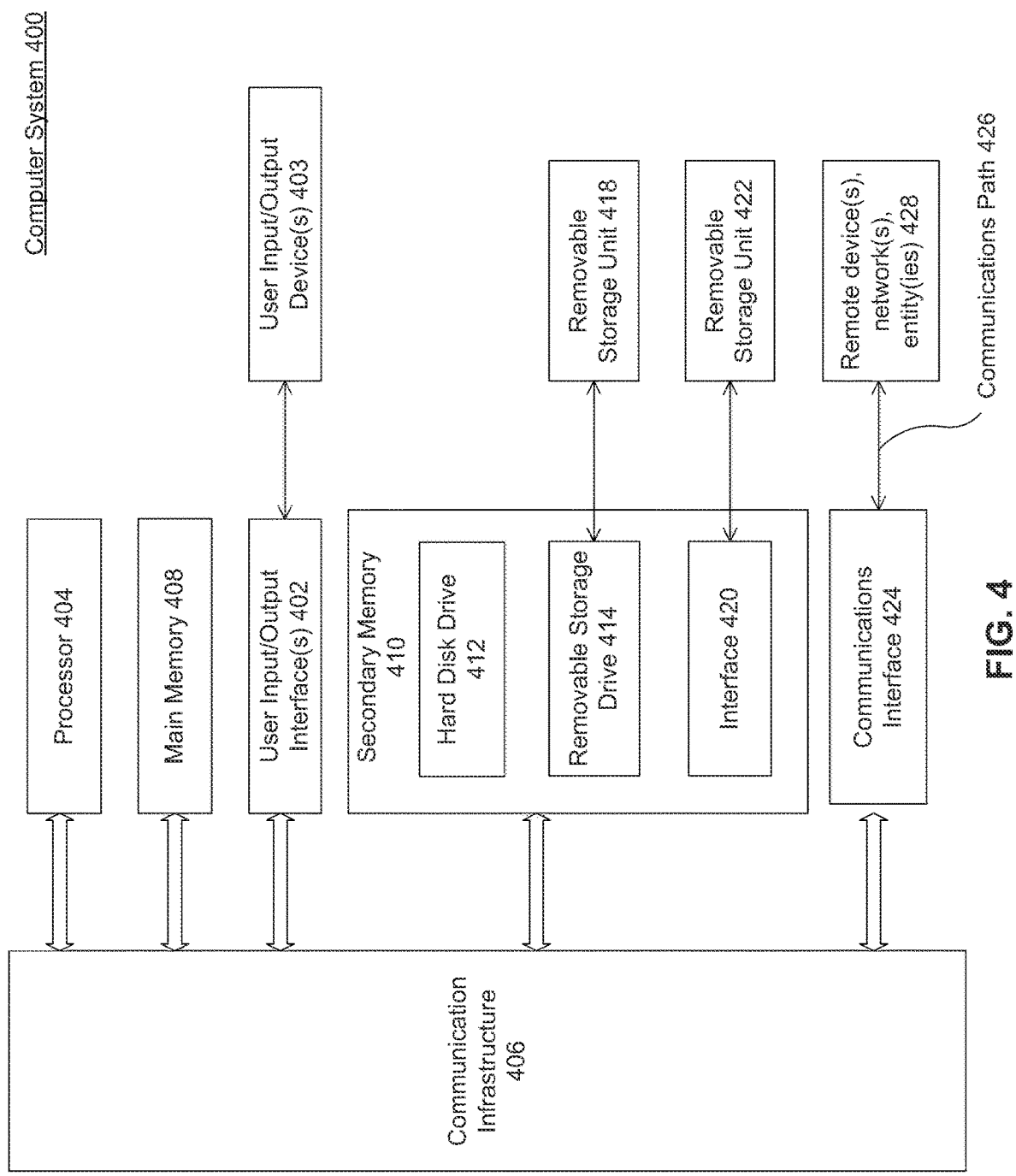
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random-access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   receiving, at an enterprise system, a request to replicate employee data hosted by a host system;
   determining a data model associated with the enterprise system;
   identifying at least one of a live date corresponding to when the employee data is to be live on the enterprise system or a selection of one or more applications to be used on the enterprise system, wherein each application is associated with a required amount of historical data;
   receiving a quality indicator from a user of the host system, wherein the quality indicator corresponds to how closely the employee data hosted by the host system corresponds to the data model;
   calculating a cutoff date for the employee data based on the quality indicator and one or more of the live date and the selection of one or more applications, the cutoff date indicating an oldest date for which the employee data is to be replicated to the enterprise system;
   determining that the employee data includes both employee data that is prior to the cutoff date and employee data that is subsequent to the cutoff date;
   replicating the employee data subsequent to the cutoff date from the host system to the enterprise system, wherein the replicated data comprises employee data that is more recent than the cutoff date; and
   providing an indication that the replication has completed and the replicated employee data is live and accessible via the enterprise system through the one or more applications.

2. The method of claim 1, wherein the employee data hosted by the host system includes first data about a first employee who left employment prior to the cutoff date, and wherein the replicated data excludes the first data about the first employee.

3. The method of claim 2, wherein the employee data hosted by the host system includes second data about the first employee who returned to the employment after the cutoff date, and wherein the replicated data excludes the first data about the first employee and includes the second data about the first employee beyond the cutoff date.

4. The method of claim 3, wherein the data hosted by the host system indicates that the first employee returned to the employment on a same contract as the first data, wherein the replicated data includes the second data about the first employee beyond the cutoff date, and a start date retrieved from the first data and associated with the contract.

5. The method of claim 1, further comprising:
   receiving a confirmation from the host system to use the cutoff date.

6. The method of claim 1, further comprising:
   receiving a new date from a user of the host system, wherein the enterprise system uses the new date as the cutoff date instead of the calculated cutoff date.

7. The method of claim 1, wherein the quality indicator comprises a selection of one of a range of values corresponding to data transformations that need to be performed to format the employee data in accordance with the data model.

8. The method of claim 1, wherein a sooner the live date is to a current date, the sooner the cutoff date is to the current date.

9. A system, comprising:
   a memory; and
   at least one processor coupled to the memory and configured to perform instructions that cause the at least one processor to perform operations comprising:
      receiving, at an enterprise system, a request to replicate employee data hosted by a host system;
      determining a data model associated with the enterprise system;
      identifying at least one of a live date corresponding to when the employee data is to be live on the enterprise system or a selection of one or more applications to be used on the enterprise system, wherein each application is associated with a required amount of historical data;
      receiving a quality indicator from a user of the host system, wherein the quality indicator corresponds to how closely the employee data hosted by the host system corresponds to the data model;
      calculating a cutoff date for the employee data based on the quality indicator and one or more of the live date and the selection of one or more applications, the cutoff date indicating an oldest date for which the employee data is to be replicated to the enterprise system;
      determining that the employee data includes both employee data that is prior to the cutoff date and employee data that is subsequent to the cutoff date;
      replicating the employee data that is subsequent to the cutoff date from the host system to the enterprise system, wherein the replicated data comprises employee data that is more recent than the cutoff date; and providing an indication that the replication has completed and the replicated employee data is live and accessible via the enterprise system through the one or more applications.

10. The system of claim 9, wherein the employee data hosted by the host system includes first data about a first employee who left employment prior to the cutoff date, and wherein the replicated data excludes the first data about the first employee.

11. The system of claim 10, wherein the employee data hosted by the host system includes second data about the first employee who returned to the employment after the cutoff date, and wherein the replicated data excludes the first data about the first employee and includes the second data about the first employee beyond the cutoff date.

12. The system of claim 11, wherein the data hosted by the host system indicates that the first employee returned to the employment on a same contract as the first data, wherein the replicated data includes the second data about the first employee beyond the cutoff date, and a start date retrieved from the first data and associated with the contract.

13. The system of claim 9, wherein the request comprises the data model associated with the replication, and wherein the determining the data model comprises determining the data model based on the request.

14. The system of claim 9, the operations further comprising:
   receiving a confirmation from the host system to use the cutoff date.

15. The system of claim 9, the operations further comprising:
   receiving a new date from a user of the host system, wherein the enterprise system uses the new date as the cutoff date instead of the calculated cutoff date.

16. A non-transitory computer-readable medium having instructions stored thereon that, when executed by at least one computing device, cause the at least one computing device to perform operations comprising:
   receiving, at an enterprise system, a request to replicate employee data hosted by a host system, wherein the request comprises the data model associated with the enterprise system;
   identifying at least one of a live date corresponding to when the employee data is to be live on the enterprise system or a selection of one or more applications to be used on the enterprise system, wherein each application is associated with a required amount of historical data;
   receiving a quality indicator from a user of the host system, wherein the quality indicator corresponds to how closely the employee data hosted by the host system corresponds to the data model;
   calculating a cutoff date for the employee data based on the quality indicator and one or more of the live date and the selection of one or more applications, the cutoff date indicating an oldest date for which the employee data is to be replicated to the enterprise system;
   determining that the employee data includes both employee data that is prior to the cutoff date and employee data that is subsequent to the cutoff date;
   replicating the employee data that is subsequent to the cutoff date from the host system to the enterprise system, wherein the replicated data comprises employee data that is more recent than the cutoff date; and
   providing an indication that the replication has completed and the replicated employee data is live and accessible via the enterprise system through the one or more applications.

17. The non-transitory computer-readable medium of claim 16, wherein the employee data hosted by the host system includes first data about a first employee who left employment prior to the cutoff date, and wherein the replicated data excludes the first data about the first employee.

* * * * *